Figure 1:
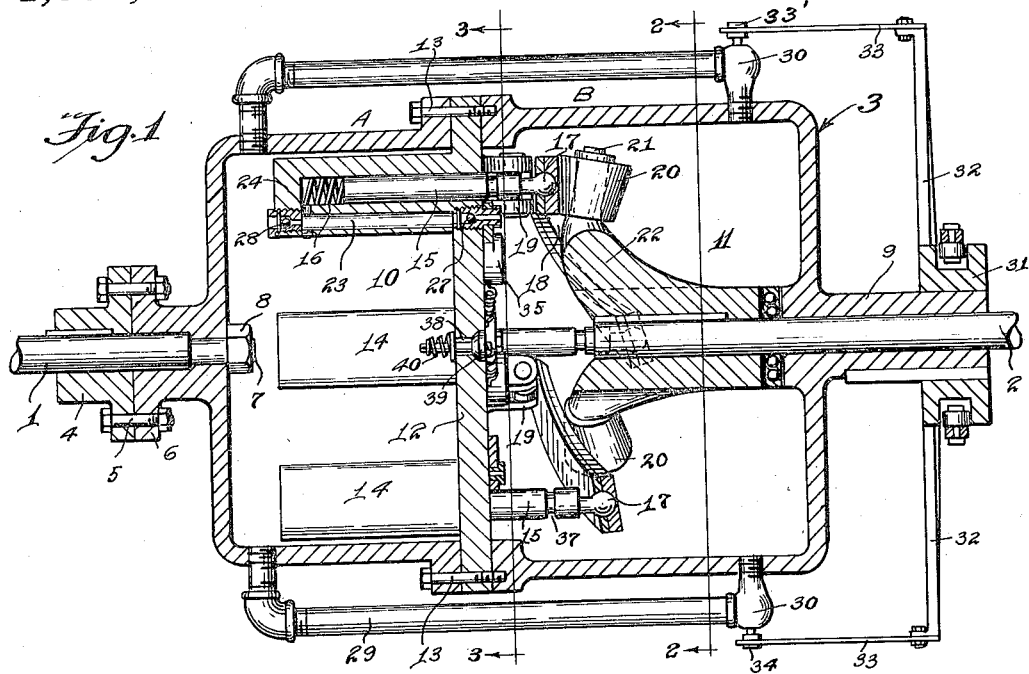

R. L. WILLIAMSON.
POWER TRANSMISSION MECHANISM.
APPLICATION FILED MAY 2, 1918.

1,398,928.

Patented Nov. 29, 1921.

Witness
A. Lundell

Inventor
Romeo L. Williamson

C. C. Shepherd
Attorney

UNITED STATES PATENT OFFICE.

ROMEO L. WILLIAMSON, OF MOUNT VERNON, OHIO.

POWER-TRANSMISSION MECHANISM.

1,398,928. Specification of Letters Patent. Patented Nov. 29, 1921.

Application filed May 2, 1918. Serial No. 232,000.

*To all whom it may concern:*

Be it known that I, ROMEO L. WILLIAMSON, a citizen of the United States, residing at Mount Vernon, in the county of Knox and State of Ohio, have invented certain new and useful Improvements in Power-Transmission Mechanism, of which the following is a specification.

This invention relates to power transmission mechanism, and has particular reference to an improved hydraulic transmission for transferring power from a driving to a driven member; the mechanism including novel features of construction for effecting different or equal speed ratios between said members.

Another object of the invention is to provide an improvement upon the mechanism disclosed in my co-pending applications bearing Serial Numbers 184,184 and 205,010, filed August 3, 1917, and December 3, 1917, respectively, the second named application having matured into Patent No. 1,293,596, issued Feb. 4, 1919.

In carrying out the invention use is made of a structure wherein an indefinite number of speeds may be obtained between a driving and a driven shaft, and to this end the structure fundamentally consists of a casing wherein is provided a low and a high pressure liquid receiving compartment, pumping mechanism being situated in common relation with said compartments to pump the liquid from one to the other thereof, a means being provided upon the driven shaft to effect the operation of the pumping structure and to establish driving relation between said shafts.

A further and important object of the invention resides in mechanism of this character wherein the pumping structure is rotated in unison with the driving shaft, and is formed to embody a yieldable, sectional, circular track adapted for frictional or wedging engagement with roller elements rigidly carried by the driven shaft, whereby under the action of resistance offered to the operation of the pumping structure by the circulation of fluid within the casing, the sections of the trackway are capable of being maintained in gripping or frictional relation with the roller elements.

A still further object is to pivotally mount certain of the ends of the sections of said trackway and to connect their opposite or free ends with spring pressed pump pistons, whereby the normal tendency of the sections is to assume angular relation, so that upon the rotation of the trackway with respect to the roller elements, the pivoted sections thereof will be successively depressed through contacting with the rigidly disposed roller elements, and the reciprocation of the pump pistons thereby effected, fluid controlling means being provided in conjunction with said pumping structure and serving at times to prevent or retard the reciprocation of said pistons, so that the angular relation of the sections of said trackway will be maintained, in order that said sections will be forced into wedge like engagement with said roller elements and thereby impart motion from the driving to the driven shaft.

Further objects of the invention reside in the provision of a structure whereby the driving and driven shafts may be mechanically freed of each other without of necessity operating the pump structure. In addition, provision is made whereby this pump structure is automatically rendered inoperative when a predetermined minimum speed of rotation is reached. Also, the invention consists in a structure whereby the pressure in the high pressure side of the mechanism may be relieved when a predetermined pressure has been reached.

With these and other objects in view, as will appear as the description proceeds, the invention accordingly consists in the novel features of construction, combination of elements and arrangement of parts hereinafter fully described and having the scope thereof defined by the claims hereunto appended.

Figure 2:
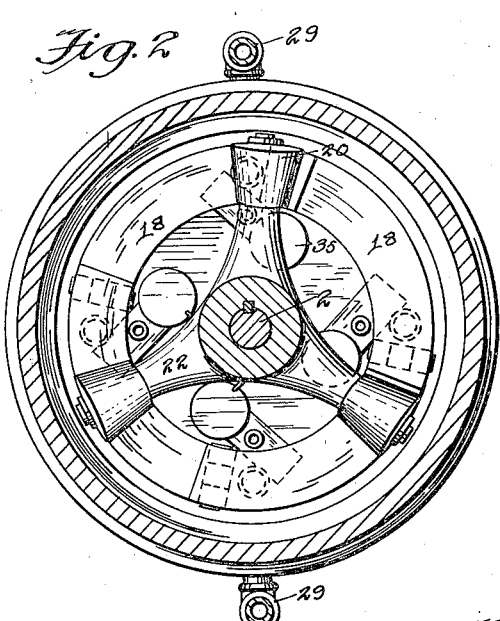
Figure 3:
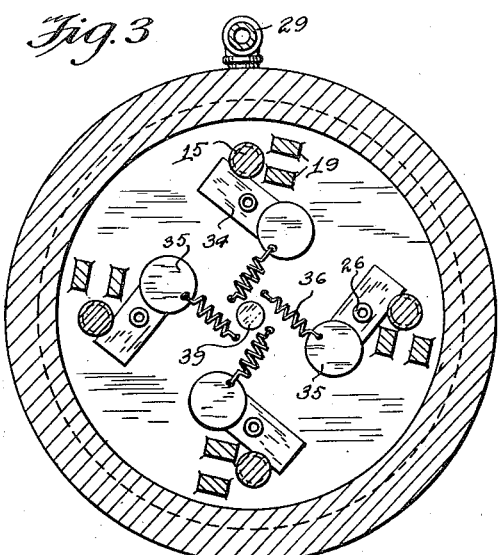
Figure 4:
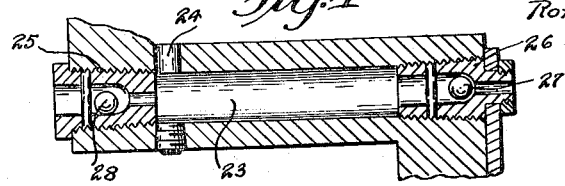

In the drawing, wherein has been shown one of the preferred embodiments of the invention, Figure 1 is a vertical longitudinal sectional view taken through my improved transmission mechanism, Fig. 2 is a transverse sectional view taken along the plane disclosed by the line 2—2 of Fig. 1, Fig. 3 is a similar view, taken along the line 3—3 of Fig. 1 and disclosing more particularly the operation of the catch elements, Fig. 4 is a fragmentary sectional view on an enlarged scale of the pumping structure.

Similar characters of reference denote corresponding parts throughout the several views of the drawing.

As shown in the accompanying drawing my improved transmission mechanism is employed in connection with a driving shaft 1 and a driven shaft 2, which shafts may be employed in any suitable capacity wherein it is desired to obtain different speed ratios therebetween. Connected for rotation with the driving shaft is a casing or an equivalent 3, this member being fastened to the driving shaft by forming the latter with a keyed coupling plate 4 to which is connected by means of bolts 5 the reduced flange end 6 of the casing 3. The inner end, in this instance, of the driving shaft is reduced and threaded as shown at 7, for the reception of a nut 8 which latter securely retains the casing in its applied position upon the shaft 1, and the coupling plate 4 is employed to connect the casing and driving shaft for uniform rotary movement. The other end of the casing 3 is provided with an integral tubular sleeve 9 which loosely engages the driven shaft 2, hence it will be seen that the casing as a whole is rigidly and rotatably supported by and between said shafts and in this instance said casing will rotate in unison with the driving shaft and independently of the driven shaft.

The casing 3, in one of its specific forms, consists of a plurality of sections A and B formed to present a high and a low pressure compartment 10 and 11 respectively. These compartments are separated through the provision of a dividing wall 12, and cap bolts 13 are employed to securely unite the sections A and B of the casing and the dividing wall 12 together, as is clearly shown in Fig. 1. One of the main provisions of the present invention resides in a pumping structure which is employed to transfer a liquid fluid from the low pressure compartment to the high pressure compartment, for a purpose to be hereinafter explained, and to this end the wall 12 is formed with a plurality of concentrically situated, longitudinally extending, integral cylinders 14, which open at their ends into the low pressure compartment, and mounted within the bores of said cylinders for reciprocation are a plurality of pistons or plungers 15, the latter being normally pressed outwardly through the agency of coiled springs 16, which are confined between the ends of the bores and the inner extremities of the plungers 15. The outer ends of the plungers project into the low pressure compartment 11 and terminate in ball shaped ends 17, and pivotally connected with said ends are the independent sections of a circular, segmental trackway 18. Each of the sections of this trackway have the end thereof, opposite to the end connected with one of the plungers 15, pivotally connected with outstanding lugs or ears 19 integrally projecting from the wall of the member 12. Thus it will be seen that said sections will be maintained in angular relation with respect to the wall 12.

Through the agency of the springs 16, the sections of the trackway 18 are normally maintained in engagement with cone shaped rollers 20, which are rotatably mounted upon stud shaped arms 21 integrally formed with a driven element 22, this element being keyed or otherwise secured for rotation with the end of the driven shaft 2. Hence it will be seen that when the shaft 1 is rotated, the casing 3 will revolve in unison therewith, and this results in drawing the sections of the circular trackway across the faces of the rollers 20, whereby the sections will be oscillated so as to effect the reciprocation of the plungers or pistons 15. It will be noted that said sections are arranged in overlapping relation and when the free ends thereof are depressed by the roller said depressed ends will lie substantially flush with the pivoted end of the next adjacent section, this being done in order to permit the roller to contact with one section after another with ease and facility and that there will be an absence of jumping from one section to the other. In the present instance there has been shown for purposes of illustration three of the rollers 20 which are adapted to engage with the four sections of the circular trackway this being done in order to permit said sections to fully respond to the outward thrust of the spring 16, thus permitting the plungers to obtain a full stroke movement.

The pumping structure further includes a plurality of bores 23, which are formed in the cylinders 14 and extend in parallel relation with the bores containing the plungers 15, said bores being in communication through the agency of ports 24, which are located at the extreme inner ends of said bores. The bores 23 terminate in threaded sockets 25, in which are positioned threaded plug members 26, these members carrying ball valves 27 and 28. Thus it will be seen that when the pistons 15 are forced inwardly by the action of the sections of the trackway engaging with the roller elements 20, the ball valves 27 controlling the entrance of fluid from the low pressure compartment into the bores 23 will be closed, and fluid contained within said bores will be expelled from the pumping structure by way of the valves 28. Upon the outward movement of the plungers the valves 28 will be automatically closed, and the valves 27 opened so that fluid will flow from the low pressure compartment into the bores 23, whereby upon the inward movement of the plungers, fluid contained within the bores thereof will be ejected into the high pressure compartment through the opening of the valves 28, thus effecting a transfer of fluid from the low pressure to the high pressure compartments. It will thus be seen that when the plungers are free to move, slight frictional or wedging relation will exist between the sections of the trackway and the rollers 20, thus permitting the driving shaft to rotate at much greater rates of speed than the driven shaft 2.

In order to place resistance upon said pistons so as to retard or check their movement, use is made of one or more pipe members 29 which are in communication with said compartments, and in fact permit of the return flow of fluid from the high pressure compartment to the low pressure compartment, and the flow of fluid through these members is controlled through the agency of valves 30, which latter may be actuated when the casing is in a state of rotation. One method of accomplishing this result is to provide the sleeved end 9 of the casing with a collar 31, which is keyed to said end for sliding and rotary movement therewith. The collar is formed to include a plurality of radially extending arms 32 and to the upper ends of which are connected link members 33, the opposite ends of said members being pivotally connected with the operating arms 33' of the valves 30. Therefore it will be manifest that by sliding the collar 31 the adjustment of the valves 30 will be effected and the flow of fluid between said compartments correspondingly regulated.

From the foregoing description it will be apparent that when the valve structures 30 are closed, or practically closed, the fluid pressure in the compartment 10 will be such that the reciprocation of the pistons 15 substantially can not be effected. This results in maintaining the sections of the trackway in angular relation with respect to the rollers 20 and hence during the rotation of the casing 3 said rollers and sections will be wedged or bound together, thereby establishing driving relation between the driving members of the mechanism and the driven members. Upon more fully opening the valves 30, the flow of fluid from the compartment 10 to the compartment 11 will be permitted in a restricted measure, thus permitting the pistons to slowly reciprocate. This relieves the intense wedging relation between the rollers 20 and the sections of the trackway 18, so that the driving shaft will be capable of rotating at a greater rate of speed than the driven shaft, and similarly when the valves are fully opened, slight resistance will be offered to the pistons by the action of fluid pressure so that the driven shaft will rotate at a much slower rate of speed than said driving shaft. It will thus be manifest that the speed ratios between said shafts are proportional to the resistance offered by the working fluid upon the pistons or plungers 15, whereby when the resistance is increased the driven shaft will be rotated at approximately the same speeds as the driving shaft, and when this resistance is lowered a great difference is obtainable between the R. P. M. of the driving shaft and the driven shaft.

In order to stop the operation of the pumping structure when the driving shaft is rotating slowly use is made of a plurality of catch members 34. These members are pivoted, as shown in Fig. 3, upon the reduced projecting ends of certain of the plug members 26, so as not to interfere with the passageways leading into the bores 23. Certain of the ends of the catch members are provided with weights 35 and to which are connected springs 36, the latter tending to revolve the catch members about their pivots so that the catch members will engage with annular grooves 37 formed in the plungers 15. It will thus be seen that when the casing 3 is rotating slowly, the plungers 15 will be forced inwardly against the pressure exerted by the springs 16 so that the grooves 37 will be brought into registration with the arc of movement of the arms 34, so that the springs 36 of said arms will revolve said catch members into engagement with said grooves and thereby lock the plungers against reciprocation. It will be seen that due to the location of the rollers 20 the plungers 15 will be automatically forced back into registration with said catch members. However, when the casing 3 increases its speed of rotation the catch members, by reason of centrifugal force exerted upon the weighted ends thereof will oscillate about their pistons to overcome the resistance offered by the springs 36. This results in freeing the plungers so as to permit the latter to be reciprocated in the manner above described. In order to relieve the mechanism of overloads and to prevent damages thereof, the divisional wall 12 is centrally formed with a valve controlled passageway 38, in which is seated a valve 39, the latter being normally maintained in its seating position through the agency of a spring 40. Thus in the event of excessive or abnormal pressures existing in the compartment 10, such pressures will be relieved by the operation of the valve 39, which is set to open when subjected to the influence of predetermined pressures.

From the foregoing description taken in connection with the accompanying drawing it will be seen that the present invention eliminates the services of radially disposed pistons and the attendant use of connecting rods and crank members which have been found to be objectionable due to the irregu- Having described the invention what is claimed as new and patentable is:

1. In a transmission mechanism of the character described, the combination with a driving and a driven shaft, of means for forming a driving connection between said shafts comprising a casing member rigidly carried by one of said shafts, said casing being divided into a high and a low pressure compartment, a pump structure operatively located between said compartments, means associated with the other of said shafts for deriving its rotary motion by coöperation with said pump structure, means for regulating the flow of fluid from the high to the low pressure compartment, and means for freeing said last named shaft from active coöperation with said pump structure during the continued rotation below a predetermined speed of the shaft carrying said casing.

2. In a transmission mechanism of the character described, the combination with a driving and a driven shaft, of means for forming a driving connection between said shafts comprising a casing member rigidly carried by one of said shafts, said casing being divided into a high and a low pressure compartment, a pump structure operatively located between said compartments, means associated with the other of said shafts for deriving its rotary motion by coöperation with said pump structure, means for regulating the flow of liquid from the high to the low pressure compartment, and means whereby said pump structure may be temporarily rendered inoperative during the continued rotation below a predetermined speed of the shaft carrying said casing.

3. In a transmission mechanism of the character described, the combination with a driving and a driven shaft, of means for forming a driving connection between said shafts, comprising a casing member rigidly carried by one of said shafts, said casing being divided into a high and a low pressure compartment, a pump structure operatively located between said compartments, means associated with the other of said shafts for deriving its rotary motion by coöperation with said pump structure, means for regulating the flow of liquid from the high to the low pressure compartment, and means for locking the pump structure out of action whereby one of said shafts may be rotated independently of the other during the continued rotation below a predetermined speed of the shaft carrying said casing.

4. In a transmission mechanism of the character described, the combination with a driving and a driven shaft, of means for forming a driving connection between said shafts comprising a casing member rigidly carried by one of said shafts, said casing being divided into a high and a low pressure compartment, a pump structure operatively located between said compartments, means associated with the other of said shafts for deriving its rotary motion by coöperation with said pump structure, means for regulating the flow of liquid from the high to the low pressure compartment, and means for locking the pump structure out of action to permit of relative rotation between said shafts and whereby one of said shafts may be rotated independently of the other during the continued rotation below a predetermined speed of the shaft carrying said casing.

5. In a transmission mechanism of the character described, the combination with a driving and a driven shaft, of means for forming a driving connection between said shafts comprising a casing member rigidly carried by said driving shaft, said casing being divided into a high and a low pressure compartment, a pump structure operatively located between said compartments, means associated with the driven shaft for deriving its rotary motion by coöperation with said pump structure, means for regulating the flow of liquid from the high to the low pressure compartment, and means for locking the pump structure out of action and to permit said driven shaft to rotate faster than the driving shaft during the continued rotation below a predetermined speed of said driving shaft.

6. In a transmission mechanism of the character described, the combination with a driving and a driven shaft, of means for forming a driving connection between said shafts comprising a casing member rigidly carried by said driving shaft, said casing being divided into a high and a low pressure compartment, a pump structure operatively located between said compartments, means associated with the driven shaft for deriving its rotary motion by coöperation with said pump structure, means for regulating the flow of liquid from the high to the low pressure compartment, and means for locking the pump structure out of action and to enable the driven shaft to rotate independently faster than the driving shaft during the continued rotation below a predetermined speed of said driving shaft.

7. In a transmission mechanism of the character described, the combination with a driving and a driven shaft, of means for forming a driving connection between said shafts comprising a casing member rigidly carried by one of said shafts, said casing being divided into a high and a low pressure compartment, a pump structure operatively located between said compartments, means associated with the other of said shafts for deriving its rotary motion by coöperation with said pump structure, means for regulating the flow of liquid from the high to the low pressure compartment, means for permitting relative rotation between said shafts without operating said pump structure when the speed of one of said shafts reaches a predetermined minimum, and means whereby the operation of said pump structure is automatically reëstablished when said minimum speed is overcome.

8. In a transmission mechanism of the character described, the combination with a driving and a driven shaft, of means for forming a driving connection between said shafts comprising a casing member rigidly carried by one of said shafts, said casing being divided into a high and a low pressure compartment, a plurality of cylinders and pistons forming a pump structure operatively located between said compartments, means associated with the other of said shafts for deriving its rotary motion by coöperation with said pump structure, means for regulating the flow of liquid from the high to the low pressure compartment, and means whereby all of said pistons may be held at the inner ends of their stroke to free said last named shaft from active coöperation with said pump structure.

9. In a transmission mechanism of the character described, the combination with a driving and a driven shaft, of means for forming a driving connection between said shafts comprising a casing member rigidly carried by one of said shafts, said casing being divided into a high and a low pressure compartment, a pump structure operatively located between said compartments including a plurality of cylinders with pistons movable therein, a plurality of segmental track members pivotally supported adjacent one end and operatively engaging said pistons, said track members being equal in number to the number of pistons, a plurality of elements carried by the other of said shafts for coöperation with said trackways, the number of elements being different from the number of pistons, and means for controlling the flow of liquid from the high to the low pressure compartment.

10. In a transmission mechanism of the character described, the combination with a driving and a driven shaft, of means for forming a driving connection between said shafts comprising a casing rigidly carried by one of said shafts and provided with a high and a low pressure compartment, a pumping structure operatively located between compartments for transferring fluid from said low to said high pressure compartment, a plurality of piston members forming a part of said structure, pivoted segmental members connected with said pistons, means carried by the other of said shafts for coöperation with said segmental members, and means for governing the rate of flow of liquid from the high to the low pressure compartment.

11. In a transmission mechanism of the character described, the combination of a driving and a driven shaft, of means for forming a driving connection between said shafts, comprising a member rigidly carried by one of said shafts and provided with a high and a low pressure compartment, a pumping structure operatively located between said compartments for effecting the transfer of fluid from one to the other thereof, substantially circularly arranged operating plungers projecting from said structure, circularly disposed segmental members having certain of the ends thereof operatively engaged by said plungers and their other ends pivotally mounted upon said member, means carried upon the other of said shafts for coöperation with said members, whereby upon the rotation of said driving shaft said latter members are capable of being successively depressed by engagement with said latter means, and a valve structure operating between said compartments, for variably controlling the return flow of fluid between said compartments.

12. In a transmission mechanism of the class described, the combination with a driving and a driven shaft, of means for forming a driving connection between said shafts, comprising a member rigidly carried by one of said shafts and provided with a high and a low pressure compartment, a divisional wall structure separating said compartments, a circularly disposed pumping structure carried by said wall, pistons forming a part of said structure and having the operating ends thereof projecting beyond said wall, circularly arranged arms having their free ends secured to said piston ends and their opposite ends pivotally connected with said wall, whereby each arm will be capable of independent movement, means carried by the other of said shafts for successively moving said arms and their connected pistons, a valve governing means operable between said compartments for controlling the return flow of fluid therebetween and thereby the resisting action of said fluid upon the movement of said pistons.

13. In mechanism of the class described, the combination with a driving and a driven member, a divisional wall structure formed in said driving member for separating the latter into a high and a low pressure compartment, a pumping structure formed in said wall and capable of forcing a fluid from the low pressure compartment to the high pressure compartment, plungers forming a part of said pumping structure and provided with substantially spherical operating extremities, a sectional trackway connected with said plunger extremities, means for pivotally mounting each section of said trackway, means mounted on the other of said shafts for coöperation with said trackway, whereby upon the rotation of said driving member said latter means are capable of successively reciprocating said plungers, and means for controlling the flow of fluid from said high to said low pressure compartment to resist movement of said plungers.

14. In mechanism of the class described, the combination with a driving and a driven member, a divisional wall structure formed in said driving member for separating the latter into a high and a low pressure compartment, a pumping structure carried by said wall and capable of forcing a fluid from the low to the high pressure compartment, pistons forming a part of said pumping structure and provided with spherical operating extremities, a pivoted arm connected with each of said extremities, roller carrying means rotatable with the other of said shafts and capable of effecting the oscillation of said arms and reciprocation of said pistons upon the rotation of said driving member, said rollers being of a lesser number than said arms to permit the pistons connected therewith to produce full stroke movements, and means for controlling the flow of fluid to resist movement of said pistons.

15. In mechanism of the class described, the combination with a driving and a driven member, a divisional wall structure formed in said driving member for separating the latter into a high and a low pressure compartment, a pumping structure carried by said wall and capable of forcing a fluid from the low to the high pressure compartment, pistons forming a part of said pumping structure and provided with spherical operating extremities, a pivoted arm connected with each of said extremities, roller carrying means rotatable with the other of said shafts and capable of effecting the oscillation of said arms and reciprocation of said pistons upon the rotation of said driving member, said rollers being of a lesser number than said arms to permit the pistons connected therewith to produce full stroke movements, means for controlling the flow of fluid to resist movement of said pistons, and catch mechanism coöperative with said pistons for retaining the latter in an inoperative position when said driving member is rotated at relatively low speeds.

16. In mechanism of the class described, the combination with a driving and a driven member, a divisional wall structure formed in said driving member for separating the latter into a high and a low pressure compartment, a pumping structure carried by said wall and capable of forcing a fluid from the low to the high pressure compartment, pistons forming a part of said pumping structure and provided with spherical operating extremities, a pivoted arm connected with each of said extremities, roller carrying means rotatable with the other of said shafts and capable of effecting the oscillation of said arms and reciprocation of said pistons upon the rotation of said driving member, said rollers being of a lesser number than said arms to permit the pistons connected therewith to produce full stroke movements, means for controlling the flow of fluid to resist movement of said pistons, catch mechanism coöperative with said pistons for retaining the latter in an inoperative position when said driving member is rotated at relatively low speeds, and means for automatically permitting of the release of said catch members when said driving member increases its speed of rotation.

17. In mechanism of the class described, the combination with a driving and a driven member, a divisional wall structure formed in said driving member for separating the latter into a high and a low pressure compartment, a pumping structure carried by said wall and capable of forcing a fluid from the low to the high pressure compartment, pistons forming a part of said pumping structure and provided with spherical operating extremities, a pivoted arm connected with each of said extremities, roller carrying means rotatable with the other of said shafts and capable of effecting the oscillation of said arms and reciprocation of said pistons upon the rotation of said driving member, said rollers being of a lesser number than said arms to permit the pistons connected therewith to produce full stroke movements, means for controlling the flow of fluid to resist movement of said pistons, catch mechanism coöperative with said pistons for retaining the latter in an inoperative position when said driving member is rotated at relatively low speeds, means for automatically permitting of the release of said catch members when said driving member increases its speed of rotation, and valve mechanism for relieving the said high pressure compartment of excessive or abnormal pressure.

In testimony whereof I affix my signature.

ROMEO L. WILLIAMSON.